Sept. 30, 1958          K. M. WHITE          2,854,095
LOAD RESPONSIVE CONTROL MEANS FOR ELEVATOR CAR
Filed Oct. 8, 1956          4 Sheets-Sheet 1
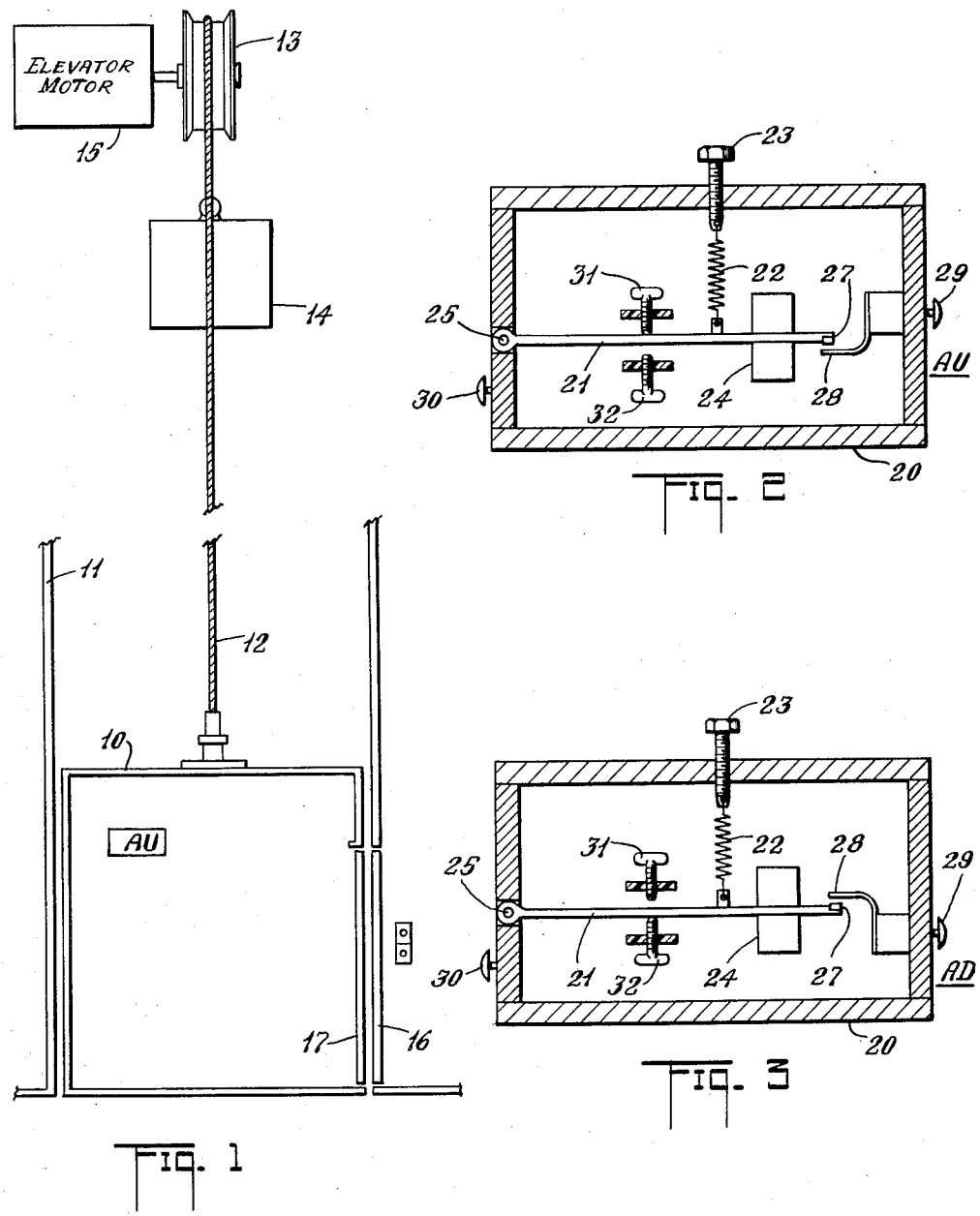
INVENTOR.
KENNETH M. WHITE

INVENTOR.
KENNETH M. WHITE

Sept. 30, 1958  K. M. WHITE  2,854,095
LOAD RESPONSIVE CONTROL MEANS FOR ELEVATOR CAR
Filed Oct. 8, 1956  4 Sheets-Sheet 3
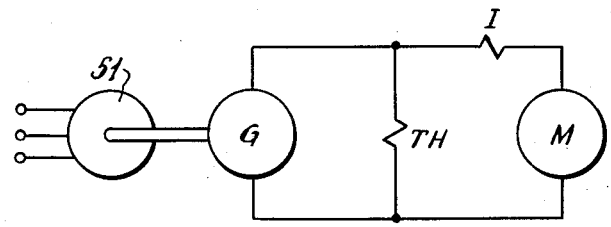
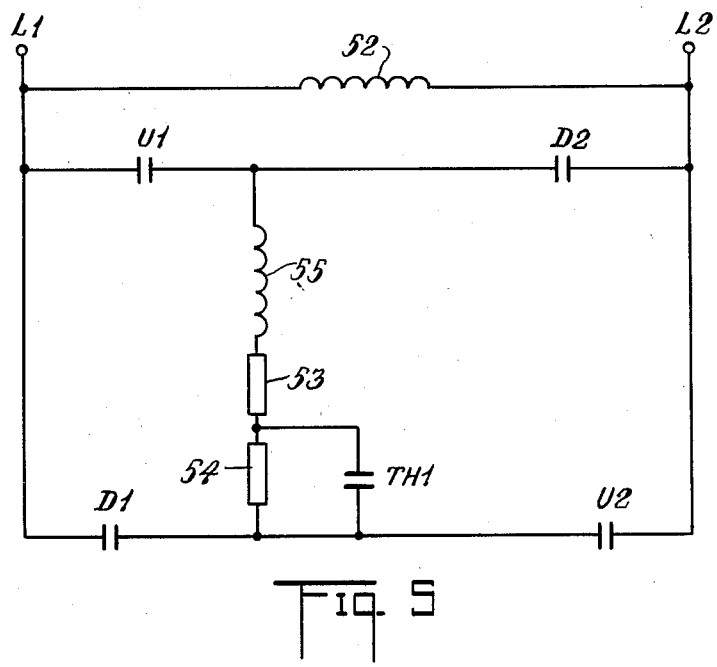
Fig. 5
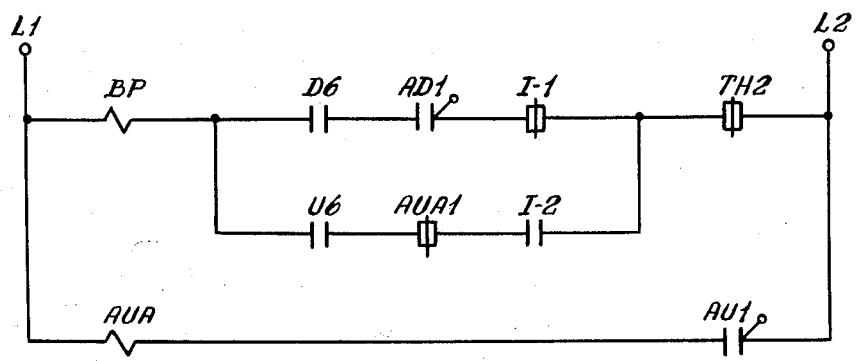
Fig. 6
INVENTOR.
KENNETH M. WHITE
BY
*Campbell, Brumbaugh, Free & Graves*
ATTORNEYS Sept. 30, 1958 K. M. WHITE 2,854,095
LOAD RESPONSIVE CONTROL MEANS FOR ELEVATOR CAR
Filed Oct. 8, 1956 4 Sheets-Sheet 4

INVENTOR.
KENNETH M. WHITE
BY
ATTORNEYS.

United States Patent Office 2,854,095
Patented Sept. 30, 1958

2,854,095

LOAD RESPONSIVE CONTROL MEANS FOR ELEVATOR CAR

Kenneth M. White, Louisville, Ky., assignor to K. M. White Company, Louisville, Ky., a corporation of Kentucky Application October 8, 1956, Serial No. 614,396

18 Claims. (Cl. 187—29)

The present invention relates to elevator control systems, and, more particularly, to means for automatically causing an elevator car to by-pass previously registered hall calls when the car is loaded at least to a predetermined amount.

Various types of control means have been developed and are currently being used to automatically cause an elevator car to by-pass previously registered landing calls when the car is loaded to a predetermined proportion of full load. In current practice, the load in a car is usually measured by a weighing device controlled either by a car platform which is movable relative to the car frame or by a weighing mechanism associated with the cable supporting the elevator car. In either case, it is necessary to specially design either the car platform or the connections to the support cable.

In accordance with the invention, automatic by-pass circuit control means are provided which are responsive to the amount of torque exerted by the elevator motor. The torque exerted by the motor is dependent upon the load placed in the elevator car, and since torque is proportional to the amount of current flowing in the motor circuit, the torque may be measured by current responsive means, such as a current responsive relay, placed in the motor circuit. Therefore, it is possible to determine when the amount of load placed on the system exceeds a predetermined value by measuring the current in the motor circuit and determining whether a given value of current is attained in the system before the car accelerates into high speed.

In accordance with a further embodiment of the invention, the load responsive measuring means for controlling the operation of the automatic by-pass circuit of the elevator system may utilize an accelerometer in combination with the current responsive measuring means. In that embodiment, circuit means are provided whereby the automatic by-pass circuit will be operated, if the elevator car reaches a predetermined amount of acceleration before the current flowing in the motor circuit reaches a predetermined value. The system may be set to cause automatic by-pass whenever the load, i. e., combined weight of the passengers in the elevator car, attains either full load or a predetermined percentage thereof.

Since it takes a given amount of current to produce a given acceleration with a given load, the control system is independent of the rate of increase of current or the maximum value which is attained by the current. Therefore, the by-pass means is independent of elevator adjustment or variations in duration of the accelerating period.

For a more complete understanding of the invention, reference may be had to the following detailed description taken in conjunction with the accompanying figures of the drawing, in which:

Figure 1 is a diagrammatic view of a single car elevator installation;

Fig. 2 is a diagrammatic view in cross-section of an embodiment of an accelerometer, in accordance with the invention;

Fig. 3 is a diagrammatic view in cross-section of an alternate embodiment of an accelerometer, in accordance with the invention;

Fig. 5 is an electrical schematic circuit diagram of an exemplary form of motor control circuit for the elevator car of Fig. 1;

Fig. 6 is an electrical schematic diagram showing an alternate embodiment of a portion of the control circuit of Fig. 4.

Figure 4:
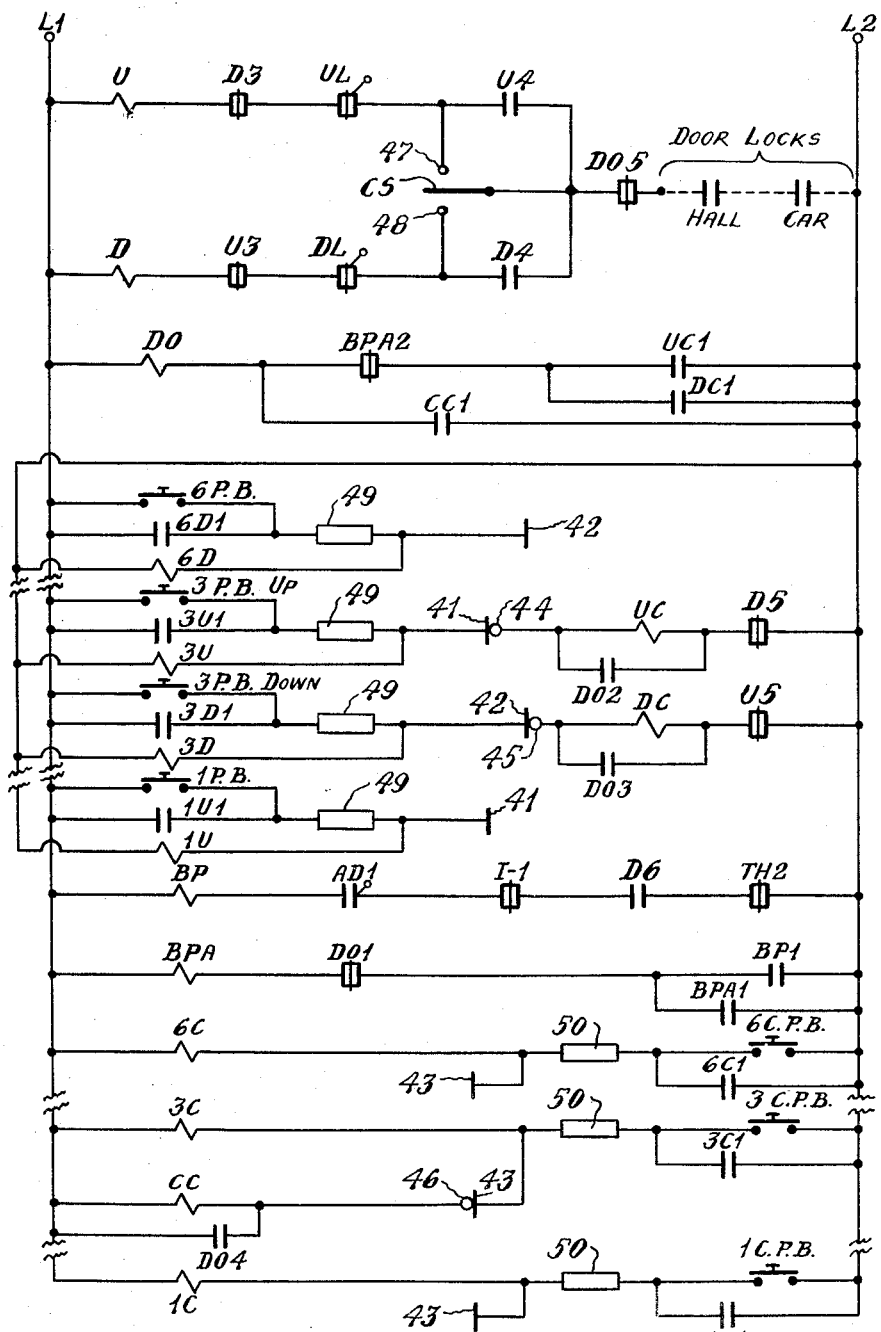
Fig. 4 is an electrical schematic circuit diagram of an exemplary form of control circuit for the elevator car of Fig. 1, including the automatic by-pass feature in accordance with the principles of the invention.
Figure 7:
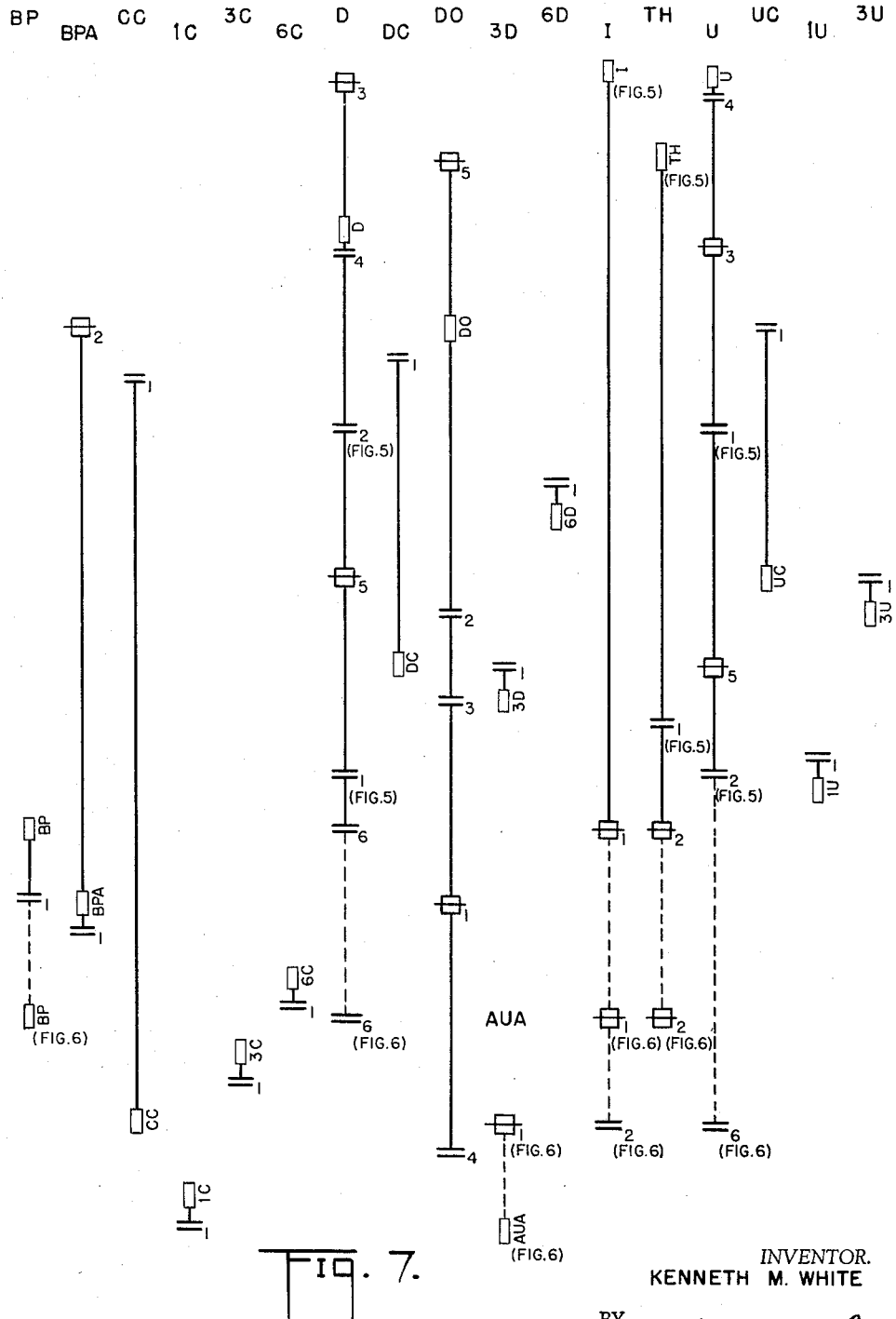
Fig. 7 is a straight line diagram showing the relative location of relays and contacts in Figs. 4, 5, and 6 of the drawing, those relays and contacts appearing in Figs. 5 and 6 being specifically identified.

Referring now to Fig. 1, an elevator car 10 is supported in a conventional manner in a hatchway 11 by means of a supporting cable 12 wound over a sheave 13 with a counter weight 14 also supported by the supporting cable 12 on the opposite side of the sheave 13. The movement of the elevator car 10 is controlled in any suitable manner such as by a conventional elevator motor 15, operating for example in accordance with the well-known Ward Leonard principle. At each floor served by the elevator, a hall door 16 opens from the floor into the hatchway. A correspondingly positioned car door 17 is mounted in the side of the elevator car 10, in a conventional manner. The operation of the hall door 16 and the car door 17 may be controlled manually or automatically in any suitable conventional manner. Up and Down hall push buttons are provided at each of the intermediate floors and at least one hall push button is provided at the terminal floors. An accelerometer unit, for example, AU, may be mounted in or on the elevator car in any suitable position, whereby it can perform the following described functions.

In Figs. 2 and 3, the accelerometer unit may comprise a housing 20. Pivotally mounted in the housing 20 in any suitable fashion, such as by means of a conventional frictionless pivot, a contact arm 21 extends from the wall of the housing 20 into the interior thereof and is movably held in position by means of a spring 22, attached at one end to the arm 21 and at the other end to an adjusting means 23, such as a threaded adjusting screw. A weight 24 is mounted on the arm 21 at a predetermined distance along the arm 21 from the pivot point 25 of the arm 21. The spring 22 is adjusted by the adjusting means 23 and the position of the weight 24 is determined in such a manner that the tip 27 of the contact arm 21 does not move into contact with the flexible contact member 28 until the unit is made to accelerate at a predetermined rate. In the preferred embodiment, the predetermined rate is 0.1 gravity or 3.2 ft/sec.$^2$ The contact member 28 is mounted on the side of the housing 20 and is in electrical contact with a connecting stud 29. The contact arm 21 is in direct electrical contact with a connecting stud 30 mounted on the side of the housing 20, and electrically insulated therefrom. Adjustable stops 31 and 32 are provided to limit the motion of the contact arm 21 and prevent uncontrolled vibration when the car starts to move.

In Fig. 2, the flexible contact member 28 is mounted below the tip 27, so that an acceleration of the complete housing 20 in an upward direction will tend to cause the tip 27 to move downwardly and contact the flexible contact 28. In Fig. 3, the flexible contact member 28 is positioned above the tip 27 of the contact arm 21 in such a manner that acceleration of the complete housing 20 in a downward direction will cause the tip 27 to tend to move upwardly to contact the flexible contact 28.

In illustrating the invention, it is assumed that the elevator 10 of Fig. 1 is adapted to serve six floors. At the first and sixth floors, it is assumed that there is a single push button, i. e., 1 P. B. and 6 P. B., for registering a call by an intending passenger. At each of the intermediate floors, e. g., the third floor, there are Up and Down push buttons, e. g., 3 P. B. Up and 3 P. B. Down for registering landing calls. These push buttons are connected in series with conventional individual floor segments 41 and 42 and in electrical series relation with respective current limiting resistors 49 and conventional corresponding floor relays, 1U, * * * 3U, 3D, * * * and 6D, between suitably energized conducting means L1 and L2. Normally open holding contacts, 1U1, 3U1, 3D1 and 6D1, are in parallel with respective push buttons and serve to maintain the registration of landing calls until answered by the elevator car. Let us also assume that there are six push buttons, 1 C. P. B.–6 C. P. B., mounted in the car for registering a car call for a particular floor. The car call push buttons are in series with respective current limiting resistors 50 and car call relays, e. g. 1C, 3C and 6C, between the conducting means L1 and L2. Normally open holding contacts, 1C1, 3C1 and 6C1, are in parallel with their respective car push buttons and serve to maintain the registration of car calls until answered by the elevator car. Conventional car call segments 43 are connected to each of the car call relays. The floor segments and car call segments may be located on a conventional type of floor selector machine (not shown) and are adapted to be placed in electrical contact in the usual manner with movable brushes whose position is controlled by the position of the elevator car.

Up and Down floor call stopping relays UC and DC are provided which are connected with brushes 44 and 45, respectively, adapted to engage appropriate floor segments 41 and 42, respectively. The relays UC and DC are selectively enabled through normally closed contacts D5 and U5, respectively, of direction relays U and D. A car call stopping relay CC having a brush 46 adapted to contact car call segments 43 is also provided.

The car stopping relay DO may be energized by normally open contacts UC1, DC1 or CC1 controlled by their respective floor call stoping relays UC and DC, or the car call stopping relay CC.

Movement of the elevator car is controlled by either of the direction relays U or D, which may be manually energized by means of a car switch CS, in a conventional manner. These relays cannot be energized until all of the hall doors and the car door are closed, thereby closing all the various door lock contacts. The relays U and D have normally open contacts in the elevator motor control circuit of Fig. 5 which control both the movement and direction of movement of the elevator car.

A by-pass relay BP and an auxiliary by-pass relay BPA control the automatic by-pass operation of the elevator car under predetermined operating conditions. The auxiliary by-pass relay BPA has a normally closed contact BPA2 in the energizing circuit for the car stopping relay DO which serves to render ineffective the operation of the floor call stopping relays UC and DC under predetermined load conditions.

All relay contacts are shown in their normal condition as when the respective relays are deenergized.

In considering the operation of the system, let us assume that the elevator car 10 is at the first floor and that an Up hall call has been registered for the third floor by pressing the push button 3 P. B. Up. When the push button 3 P. B. Up is pressed, the hall call relay 3U is energized and establishes a holding circuit through the normally open contact 3U1. A suitable indication of the registered Up hall call is also made in the elevator car, in any conventional manner, indicating to the operator of the elevator car that he should proceed in the up direction to answer the registered call.

The operator then moves the car switch CS to contact 47. Assuming that all of the hall doors and the car door are closed, the Up direction relay U is energized through the normally closed contact D3, a normally closed Up limit switch UL, and the door lock contacts. A contact U3 is opened in the energizing circuit for the Down direction relay D, thereby preventing energization of that relay while the car is moving in the up direction. A contact U4 is closed to provide a holding circuit, so that the operator may release the car switch CS once the car has started.

In the motor control circuit of Fig. 5, the generator G is being driven by a motor 51, which may be energized from any suitable electrical source, such as a three phase alternating current source. The shunt field 52 for hoist motor M is separately excited from a direct current voltage source (not shown) connected to L1 and L2. Until either the contacts U1 and U2 or D1 and D2 are closed, the shunt field 55 for the generator G of the motor-generator set is disconnected. However, when the relay U is energized, the contacts U1 and U2 are closed, thereby energizing the generator shunt field 55 in such a manner as to cause the motor M to drive the elevator car in the up direction. As the car approaches the third floor landing, the brush 44 of the Up floor call stopping relay UC contacts the floor segment 41 and the relay UC is energized through the closed contact D5 and the closed contact 3U1. When the relay UC picks up, the normally open contact UC1 in the energizing circuit for the relay DO is closed, thereby energizing the relay DO. The elevator car is brought to a stop at the third floor landing in a conventional manner, when the normally closed contact DO5 in the energizing circuit for the direction relays U and D opens to drop out the Up direction relay U. As the elevator car is being brought to a stop, a normally open contact DO2 closes and shorts out the Up floor stopping relay UC and the Up hall call relay 3U, thereby cancelling the registered Up hall call at the third floor. Current limiting resistor 49 prevents an excessive current flow during the cancelling operation.

Let us now assume that the intending passenger at the third floor enters the elevator car and his floor preference is indicated by pressing push button 6 C. P. B. This picks up the car call relay 6C, which in turn closes the contact 6C1 to provide a holding circuit locking itself in. The car and hall doors are then closed and the operator again moves the car switch CS to contact 47 energizing the direction relay U and causing the elevator car to proceed toward the sixth floor, in the same manner as that discused with the departure of the car from the first floor.

As the elevator car approaches the sixth floor, the brush 46 of the car call stopping relay CC contacts the car call stopping segment 43 at the sixth floor and the relay CC is energized through the closed contact 6C1. The contact CC1 in the energizing circuit for the car stopping relay DO is then closed energizing the relay DO and stopping the car at the sixth floor. As the car is being brought to a stop, the normally open contact DO4 is closed shorting out the relays CC and 6C, thereby cancelling the car call for the sixth floor.

Let us now assume that the car becomes fully loaded at the sixth floor with passengers desiring to go to the lower floors. The operator closes the car and hall doors and moves the car switch CS to contact 48, energizing the Down direction relay D through the normally closed contact U3, a normally closed Down direction limit switch DL and the closed door lock contacts. When the relay D picks up, the contacts D1 and D2 are closed causing the elevator car motor M to be energized with the direction of the generator shunt field 55 reversed, so that the car starts in the down direction.

Suitable speed control means, such as voltage responsive relay TH connected across generator G, is provided. For example, when the generator voltage has increased to predetermined amount, the relay TH is energized. As soon as the relay TH is energized, a contact TH1 closes, shorting out the resistor 54, so as to permit the motor-generator set to drive the elevator car at a high speed suitable for traveling a distance of more than one floor.

In series relation with the motor M and the generator G of the elevator motor-generator set, there is a current responsive means I, which preferably takes the form of a current responsive relay adapted to pick up when the current flowing through the motor M reaches a predetermined value. As previously mentioned, since the torque exerted by the motor is proportional to the current, the relay I picks up when the motor torque reaches a predetermined value.

The energizing circuit for the by-pass relay BP includes a normally open contact AD1 which is operated by a Down direction accelerometer unit AD, such as that shown in Fig. 3, the contact AD1 representing the contact between the tip 27 of the contact arm 21 and the flexible contact member 28. A normally closed contact I-1 of the current responsive relay I, a normally open contact D6 of the Down direction relay D, and a normally closed contact TH2 of the high speed relay TH are also included in the energizing circuit for the relay BP in series with the contact AD1.

Accordingly, when the car is set for travel in the down direction, the relay BP will pick up, if, as in the preferred embodiment, the car acceleration reaches the predetermined value of 3.2 ft./sec.² before the contacts TH2 and I-1 open, that is before the car is moved into a high speed satisfactory for travel between more than one floor and before the motor torque has reached a predetermined value. Those conditions will obtain only when the load in the elevator car is equal to or exceeds a predetermined percentage of full load, for example 70% full load. If the load is less than 70% full load, the car will accelerate more slowly and the current responsive relay contact I-1 will have opened before the contact AD1 closes. Thus the relay BP will only pick up if the load in the elevator car is at or above the predetermined percentage of full load.

Since the car is assumed to have been fully loaded at the top floor, the contact AD1, controlled by the accelerometer unit AD of Fig. 3 will close before either the contact I-1 or contact TH2 opens and the by-pass relay BP will pick up. When the relay BP picks up, a contact BP1 in the energizing circuit for the auxiliary by-pass relay BPA closes energizing the relay BPA. The relay BPA seals itself in by closing a holding contact BPA1. Thus, even though the contacts TH2 and I-1 may open after the accelerometer contact A closed, the relay BPA will remain energized until the relay DO picks up during the next stopping operation of the car. Since the relay BPA drops out when the car is stopped, it is evident that the load condition of the car is determined after each stop.

When the relay BPA picks up, the normally closed contact BPA2 in the energizing circuit for the car stopping relay DO is opened, thereby rendering ineffective the floor stopping relays UC and DC. As an example of the effect of this operation, let us assume that while the car was loading at the sixth floor or sometime before the car approached the third floor, a Down hall call is registered at the third floor by pressing the push button 3 P. B. Down. Since the car is traveling in the down direction, the Down direction relay D is energized, the Up direction relay U is dropped out, and the contact U5 is closed thereby enabling the floor call stopping relay DC. Therefore, when the brush 45 contacts the Down floor segment 42 associated with the relay 3D, the relay DC picks up and closes the contact DC1 in the energizing circuit for the DO relay. However, since the BPA2 contact is open, the DO relay does not pick up and the car automatically by-passes the third floor Down call.

On the other hand, let us assume that one or more of the passengers who entered the elevator at the sixth floor had indicated a desire to stop at the third floor. In that case, the push button 3 C. P. B. would have been pressed and a car call would have been registered for the third floor by causing the car call relay 3C to pick up and seal itself in through the contact 3C1. Even though the energization of the DC relay as the car approached the third floor would have no effect upon the car stopping relay DO, the car call stopping relay CC will pick up and close the contact CC1, causing the energization of the relay DO and the stopping of the car at the third floor.

Generally, it is only necessary to provide an automatic by-pass feature in the down direction. However, under some circumstances, it may be desirable to have the automatic by-pass feature operate in both the up and down directions of travel of the car, or even in just the up direction. As shown in the alternate embodiment of Fig. 6, the relay BP may be caused to be energized in either direction of travel by the addition of a parallel energizing path through a normally open contact U6, a normally closed contact AUA1 and a normally open contact I-2. In parallel with these three contacts are the contacts D6, I-1 and AD1, arranged in substantially the same manner as shown in Fig. 4. The contact AUA1 is controlled by the auxiliary Up direction acceleration relay AUA, which is in turn controlled by a normally open contact AU1, corresponding to the contact formed by the tip 27 of the contact arm 21 and the flexible contact member 28 in the accelerometer AU of Fig. 2.

The normally open contact I-2 may be controlled by the current responsive relay I in the motor generator circuit, or by a separate current responsive relay independently adjustable, and closes whenever the current reaches a predetermined value, i. e., when the elevator motor exerts a predetermined torque. The reason that the contact I-2 is a normally open contact whereas the contact I-1 in the Down by-pass circuit is a normally closed contact is that when an elevator car is starting in the down direction, a maximum amount of current is required to accelerate the car to a given value of acceleration when there is no load in the car and a minimum amount of current is required to accelerate the car to the same value when the car is fully loaded. In contrast, when a car is starting in the up direction, a minimum amount of current is required to cause the car to be accelerated to the given value of acceleration when the car is unloaded and a maximum amount of current is required to accelerate the car to the given value of acceleration when the car is fully loaded. In either case, an intermediate value of current is required to accelerate the car to a given value of acceleration when the car is loaded to a predetermined percentage of full load, for example 70% full load.

Thus when the load in the car is below a predetermined percentage of full load, and is starting in the down direction, the value of the current flowing in the motor circuit when the car reaches a given value of acceleration will be above the value of current necessary to energize the current responsive relay I and the contact I-1 will be open when the contact AD1 is closed by the accelerometer AD in response to the predetermined acceleration of the elevator car. In the situation when the car is traveling in the up direction and is loaded to a degree below the predetermined percentage of full load, the current flowing in the motor circuit when the car reaches the predetermined acceleration at which the Up accelerometer AU operates is below the value necessary to energize the current responsive relay I and the contact I-2 will remain open. Therefore, in each of the above cases, the by-pass relay BP will not pick up.

However, when the car is traveling in the down direction and is loaded at or above the predetermined percentage of full load, the current flowing in the motor circuit will be less than that necessary to energize the current responsive relay I and the contact I–1 will remain closed at least until the contact AD1 closes, so that the relay BP will pick up when the contact AD1 closes. In the case of travel in the up direction, when loaded at or above the predetermined percentage of full load, the current in the motor circuit will be greater than that required to energize the current responsive relay I and the contact I–2 will be closed before the elevator car reaches the given value of acceleration at which point the Up accelerometer AU will operate to close the contact AU1 and energize the relay AUA to open the contact AUA1. Therefore, the by-pass relay BP will be picked up under that condition.

In the preferred embodiment of the invention, the auxiliary accelerometer relay contact AUA1 is used instead of a normally closed contact operated directly by the accelerometer. The purpose of this arrangement is to have a normally open contact controlled by the accelerometers in each direction to further prevent vibrations causing a fluttering of the contact and a consequent misoperation of the by-pass relay.

Thus it is seen that the automatic by-pass feature of the invention provides a means whereby the load condition of the car is determined as a function of the torque exerted by the elevator car drive motor and the acceleration of the car as it starts from the floor at which it was last stopped. When these conditions are such as to indicate that the car is loaded to or beyond a predetermined load level, the car will automatically by-pass registered hall calls, but will stop for registered car calls.

The above embodiments are meant to be merely exemplary and it will be evident to those skilled in the art that they are susceptible of modification and variation without departing from the spirit and scope of the invention. For example, while the system disclosed is an attendant operated system for a single car, it will be evident that the principles of the invention are equally applicable to non-attendant systems and to systems involving a bank of elevator cars, operating either on an individual selective-collective basis or under the control of a dispatcher.

It will be understood that while the elevator car brake mechanism and control, and other safety devices are not shown in the above embodiments, they may be used in conjunction therewith, in accordance with standard practices. Also, while hall lanterns and car indicating lights for car and hall calls are not shown, it will be obvious that any suitable conventional signaling system can be used. Further, it will be evident that the principles of the invention are in no way limited to the specific details of the particularly disclosed accelerometers of Figs. 2 and 3. Accordingly, the invention is not deemed to be limited except as defined by the appended claims.

I claim:

1. In a control system for an elevator car adapted to travel between a plurality of floors having means for registering hall calls operable by intending passengers and means for causing the elevator car to stop at floors for which hall calls have been registered, the combination therewith of a motor for controlling the travel of the elevator car and load responsive by-pass means for causing said car to by-pass registered hall calls operable when a predetermined amount of torque is exerted by the motor before the car is caused to accelerate into a predetermined high speed.

2. In a control system for an elevator car adapted to travel between a plurality of floors having means for registering hall calls operable by intending passengers and means for causing the elevator car to stop at floors for which hall calls have been registered, the combination therewith of a motor for controlling the travel of the elevator car and load responsive by-pass means for causing said car to by-pass registered hall calls, comprising means operable when said motor exerts a predetermined torque and means responsive to said last-mentioned means for rendering ineffective said stopping means.

3. In a control system for an elevator car having means operable by intending passengers for registering hall calls and means for causing the elevator car to stop at floors for which hall calls have been registered, the combination therewith of a motor for controlling the travel of the car between a plurality of floors and load responsive by-pass means for causing said car to by-pass registered hall calls, comprising means operable when said motor exerts a predetermined torque before said car accelerates into a predetermined high speed and means responsive to said last-mentioned means for rendering ineffective said stopping means.

4. A control system for an elevator car, comprising a motor adapted to cause the car to travel between a plurality of floors, means operable by intending passengers for registering hall calls, means for causing the elevator car to stop at floors for which hall calls have been registered, and load responsive by-pass means for causing said car to by-pass registered hall calls when said motor exerts a predetermined torque before said car accelerates into a predetermined high speed.

5. In a control system for an elevator car adapted to travel between a plurality of floors under the control of a motor having means operable by intending passengers for registering hall calls and means for causing the elevator car to stop at floors for which hall calls have been registered, the combination therewith of load responsive by-pass means for causing said car to by-pass registered hall calls, comprising means operable when a predetermined torque has been exerted by said motor and means responsive to the acceleration of said elevator car for determining when said elevator car attains a predetermined value of acceleration.

6. A control system for an elevator car driven by an electric motor and adapted to travel between a plurality of floors having means operable by intending passengers for registering hall calls and means for causing the elevator car to stop at floors for which hall calls have been registered, load responsive by-pass means for causing said car to by-pass registered hall calls, comprising means responsive to a predetermined value of current flowing through said electric motor and means responsive to said last-mentioned means for rendering ineffective said car stopping means if said current attains a predetermined value before said car accelerates into a predetermined high speed.

7. In a control system for an elevator car driven by an electric motor between a plurality of floors having means for registering hall calls operable by intending passengers and means for causing the elevator car to stop at floors for which hall calls have been registered, the combination therewith of load responsive means for causing said car to by-pass registered hall calls, comprising means responsive to the current flowing in said electric motor and means responsive to the acceleration of the elevator car.

8. A control system for an elevator car, comprising an electric motor for driving said elevator car between a plurality of floors, means operable by intending passengers for registering hall calls, means for causing the elevator car to stop at floors for which hall calls have been registered, current responsive means adapted to be operated when the current flowing through said electric motor attains a predetermined value and means responsive to the operation of said current responsive means before said elevator car accelerates to a predetermined high speed for rendering ineffective said car stopping means.

9. A control system for an elevator car, comprising an electric motor for controlling the travel of the car between a plurality of floors, means operable by intending passengers for registering hall calls, means for causing the elevator car to stop at floors for which hall calls have been registered, means responsive to a predetermined current flow in said electric motor and means responsive to the operation of said current responsive means before said elevator car attains a predetermined value of acceleration for rendering ineffective said car stopping means.

10. A control system for an elevator car, comprising an electric motor for driving said elevator car between a plurality of floors, means operable by intending passengers for registering hall calls, means for causing the elevator car to stop at floors for which hall calls have been registered, current responsive means operable when said current in said electric motor attains a predetermined value and means responsive to the acceleration of said elevator car for rendering ineffective said car stopping means, provided said elevator car attains a predetermined value of acceleration before the operation of said current responsive means.

11. In a control system for an elevator car having a motor controlling the travel of the car between a plurality of floors, means for starting said elevator car, means operable by intending passengers for registering hall calls and means for causing the elevator car to stop at floors for which hall calls have been registered, the combination therewith of load responsive by-pass means for causing said car to by-pass registered hall calls, if the torque exerted by said motor attains a predetermined value within a predetermined time from the operation of said starting means.

12. A control system for an elevator car having an electric motor for controlling the travel of the car between a plurality of floors, comprising means for registering hall calls operable by intending passengers, means for causing the elevator car to stop at floors for which hall calls have been registered, and means for rendering ineffective said car stopping means when the current drawn by said electric motor attains a predetermined value, provided the elevator car has not reached a predetermined value of acceleration.

13. A control system for an elevator car, comprising an electric motor for controlling the travel of the car between a plurality of floors, means operable by intending passengers for registering hall calls, means for causing the elevator car to stop at floors for which hall calls have been registered, and means for rendering ineffective said car stopping means when the current drawn by said electric motor fails to exceed a predetermined value before said elevator car attains a predetermined rate of acceleration.

14. In a control system for an elevator car adapted to travel between a plurality of floors under the control of a motor having means operable by intending passengers for registering hall calls in one direction, means operable by intending passengers for registering hall calls in the opposite direction, and means for causing the elevator car to stop at floors for which hall calls have been registered, the combination therewith of load responsive by-pass means for causing said car to by-pass registered hall calls in said one direction comprising current responsive means operable when the current drawn by said electric motor is less than a predetermined value when said elevator car attains a predetermined rate of acceleration.

15. In a control system for an elevator car adapted to travel between a plurality of floors under the control of an electric motor having means operable by intending passengers for registering hall calls in one direction, means operable by intending passengers for registering hall calls in the opposite direction, and means for causing the elevator car to stop at floors for which hall calls have been registered, the combination therewith of load responsive by-pass means for causing said car to by-pass registered hall calls in said one direction, comprising current responsive means for rendering said car stopping means ineffective when the current drawn by said electric motor attains a predetermined value, provided that the elevator car has not attained a predetermined rate of acceleration.

16. In a control system for an elevator car adapted to travel between a plurality of floors under the control of an electric motor having means operable by intending passengers for registering hall calls in the up direction, means operable by intending passengers for registering hall calls in the down direction and means for causing the elevator car to stop at floors for which hall calls have been registered, the combination therewith of load responsive by-pass means for causing said car to by-pass registered hall calls in the down direction, comprising current responsive means for rendering said car stopping means ineffective if the value of the current drawn by said electric motor is less than a predetermined amount when said elevator car attains a predetermined rate of acceleration.

17. In a control system for an elevator car adapted to travel between the plurality of floors under the control of an electric motor having means operable by intending passengers for registering hall calls in the up direction, means operable by intending passengers for registering hall calls in a down direction and means for causing the elevator car to stop at floors for which hall calls have been registered, the combination therewith of load responsive by-pass means for causing said car to by-pass registered hall calls in the up direction, comprising current responsive means for rendering said car stopping means ineffective when the current drawn by said electric motor attains a predetermined value, provided said elevator car has not attained a predetermined rate of acceleration.

18. In a control system for an elevator car adapted to travel between the plurality of floors under the control of an electric motor having means operable by intending passengers for registering hall calls in the up direction, means operable by intending passengers for registering hall calls in a down direction and means for causing the elevator car to stop at floors for which hall calls have been registered, the combination therewith of load responsive by-pass means for causing said car to by-pass registered hall calls comprising first current responsive means for rendering said car stopping means ineffective in response to registered hall calls in the down direction when the current drawn by said electric motor fails to attain a predetermined value before said elevator car attains a predetermined rate of acceleration and second current responsive means for rendering said car stopping means ineffective in response to hall calls registered in the up direction when the current drawn by said electric motor attains a predetermined value, provided that said elevator car has not attained a predetermined rate of acceleration.

References Cited in the file of this patent

UNITED STATES PATENTS 2,620,898    Lund    Dec. 9, 1952